(12) United States Patent
Bjølseth

(10) Patent No.: US 11,496,333 B1
(45) Date of Patent: Nov. 8, 2022

(54) AUDIO REACTIONS IN ONLINE MEETINGS

(71) Applicant: Cisco Technology, Inc., San Jose, CA (US)

(72) Inventor: Tore Bjølseth, Hvalstad (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/484,482

(22) Filed: Sep. 24, 2021

(51) Int. Cl.
  *G06F 15/16* (2006.01)
  *H04L 12/18* (2006.01)
  *G06V 40/20* (2022.01)

(52) U.S. Cl.
  CPC ......... *H04L 12/1831* (2013.01); *G06V 40/20* (2022.01); *H04L 12/1822* (2013.01)

(58) Field of Classification Search
  None
  See application file for complete search history.

(56) References Cited

U.S. PATENT DOCUMENTS

| | | | | |
|---|---|---|---|---|
| 10,820,060 | B1* | 10/2020 | Bosworth | ........ H04N 21/44218 |
| 2010/0253689 | A1* | 10/2010 | Dinicola | ............... H04M 3/567 |
| | | | | 382/190 |
| 2011/0295392 | A1* | 12/2011 | Cunnington | ........... G06Q 10/10 |
| | | | | 702/19 |
| 2012/0331387 | A1* | 12/2012 | Lemmey | .............. H04N 21/422 |
| | | | | 715/781 |
| 2013/0002801 | A1* | 1/2013 | Mock | .................... G06F 3/0488 |
| | | | | 348/E7.083 |
| 2016/0370975 | A1* | 12/2016 | Collins | ............... G06F 3/04817 |
| 2019/0124128 | A1* | 4/2019 | Bader-Natal | ........ G06F 3/04842 |
| 2020/0267106 | A1* | 8/2020 | Wills | ...................... H04L 51/42 |
| 2020/0322299 | A1* | 10/2020 | Kwatra | ................. H04L 67/535 |
| 2020/0349429 | A1* | 11/2020 | Vendrow | .................. H04N 7/15 |
| 2021/0067476 | A1* | 3/2021 | Baker | ..................... G06T 13/80 |
| 2021/0096703 | A1* | 4/2021 | Anzures | ............... G06F 3/0482 |
| 2021/0211768 | A1* | 7/2021 | Zhong | .................... H04N 21/44 |
| 2021/0306173 | A1* | 9/2021 | Krikunov | ............... G06F 3/011 |

FOREIGN PATENT DOCUMENTS

WO     WO-2015104689 A1 *  7/2015  ......... H04L 12/1831

OTHER PUBLICATIONS

Rik Van Hemmen, "A Method for Providing Audience Reaction in Zoom Style Meetings and Remote Broadcasts," https://martinottaway.com/rhemmen/a-method-for-providing-audience-reaction-in-zoom-style-meetings-and-remote-broadcasts/, May 7, 2020, 3 pages.
Microsoft Teams, "Add Live Reaction Option in meetings—Welcome to UserVoice!," Forum, https://microsoftteams.uservoice.com/forums/555103-public/suggestions/40740535-add-live-reaction-option-in-meetings, retrieved Aug. 24, 2021, 5 pages.

* cited by examiner

*Primary Examiner* — Phyllis A Book
(74) *Attorney, Agent, or Firm* — Edell, Shapiro & Finnan, LLC

(57) ABSTRACT

Presented herein is an audio reaction system and method for virtual/online meeting platforms where a participant provides a reaction (applause, laughter, wow, etc.) to something the presenter said or did. The trigger is a reaction feature in which participants press an emoticon button in a user interface or active some other user interface function to initiate message indicating a reaction.

20 Claims, 7 Drawing Sheets

AUDIO REACTIONS IN ONLINE MEETINGS

TECHNICAL FIELD

The present disclosure relates to online meeting systems and services.

BACKGROUND

When in an online meeting or webinar with many participants, or generally when someone is presenting to a small or large group of participants, it is customary for the participants to be muted (to reduce noise and distractions). In webinars, all participants are usually force-muted by default.

In any of these situations, it can be very difficult for the presenter to get any feedback from the other participants, and sometimes it may feel, to the presenter, as if he/she is talking to a void. Listeners are also affected. The lack of feedback from colleagues and fellow listeners can make the meeting more monotonous and increases fatigue.

DESCRIPTION OF EXAMPLE EMBODIMENTS

Overview

Briefly, in a communication session among a plurality of participants at respective ones of a plurality of user devices, a reaction message is received indicating a reaction from at least a first user device initiated by a first participant at the first user device during the communication session. Based on the reaction indicated in the reaction message, reaction audio is generated. The reaction audio is sent to the plurality of user devices.

Example Embodiments

Presented herein is an audio reaction system and method for virtual/online meeting platforms where a participant provides a reaction (applause, laughter, wow, etc.) to something the presenter said or did. The trigger is a reaction feature in which participants press an emoticon button in a user interface or active some other user interface function to initiate message indicating a reaction. The reaction feature could also be triggered by gesture analysis (visually detecting a participant clapping, laughing, or giving a "thumbs up").

The client device sends a reaction event to the server, where the server composes reaction sounds back to all the other connected clients. Thus, the solution works even if the client is muted. This reaction system and method can be used cross-platform, and the other video clients do not need to provide any specific support, as the audio signals are sound signals sent by the server.

Figure 1:
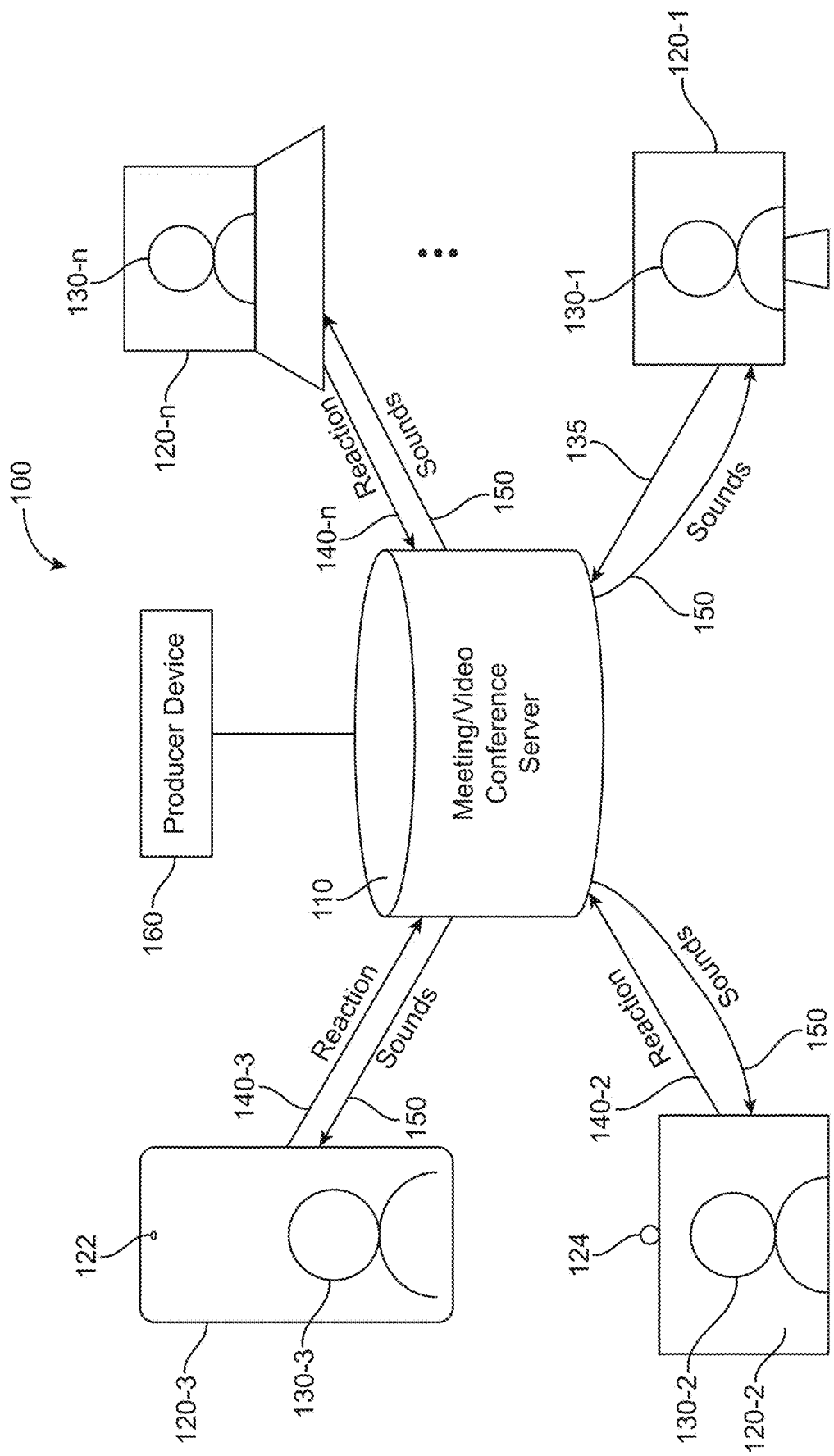
FIG. 1 is a system block diagram of a virtual/online meeting system that includes a meeting server and a plurality of user devices that connect to the meeting server and for which reaction audio is generated and distributed to the user devices according to reactions received from one or more participants in a communication session, according to an example embodiment.

Reference is now made to FIG. 1, which shows a system 100 that includes a meeting/video conference server (simply called "server") 110 and a plurality of client (user) devices 120-1, 120-2, 120-3, . . . , 120-n, that are in communication with the server 110. The server 110 manages the setup and distribution of content (audio, video, data, etc.) associated with a meeting among a plurality of participants at their respective client devices. The client devices 120-1-120-n may be desktop computers (with a display, keyboard, camera, microphone, etc.), laptop computers, dedicated video conference endpoint, smartphones, tablet computers, wearable computing device, or any other device now known or hereinafter developed that enables a person to participate via audio and audio/video in a meeting or communication session with one or more other persons. As an example, user devices 120-2 and 120-3 are shown having video cameras 122 and 124, respectively.

The server 110 may be a standalone-dedicated server, part of a server cluster that is local to a particular enterprise, or part of a cluster or bank of computing resources in the cloud. The server 110 and client devices 120-1-120-n communicate via one or more networks (not shown in FIG. 1 for simplicity), such as wired or wireless local area networks, and wired or wireless wide area networks.

FIG. 1 also shows a mechanism by which a participant at a client device may send to the server 110 a reaction to something that participant sees and/or hears during a meeting/session. In the example shown in FIG. 1, the participant 130-1 at client device 120-1 is a meeting host, announcer, presenter, teacher, instructor, etc., and is providing presentation content 135 during a meeting/session. Participants 130-2, 130-2, . . . , 130-n at client devices 120-1-120-n, respectively, are attendees, participants or audience members. The meeting server is configured to receive reactions initiated by participants 130-2-130-n via user interface command/input on client devices 120-2-120-n, and to provide sounds/audio back to the client devices 120-1-120-n so that the meeting host or presenter 130-1 as well as the meeting participants 130-2-130-n experience, during a meeting/session, sound/audio feedback generated by the server 110 based on the reactions received from the client devices 120-2-120-n during the meeting/session. That is, participant 130-2 initiates a reaction 140-2, via a user interface screen presented on client device 120-2 during a meeting/session, participant 130-3 initiates a reaction 140-3, via a user interface screen presented on client device 120-3, and participant 130-n initiates a reaction 140-n, via a user interface screen presented on client device 120-n. The server 110 receives from the client devices 120-2-120-n the messages indicating the various reactions 140-2-140-n, and generates audio/sounds 150 that is provided back to the client device 120-1 associated with the meeting host/presenter 130-1 as well as to all the other client devices **120-2-120-*n* of participants 130-2-130-*n*** in the meeting/session.

FIG. 1 further shows a producer device 160 that is separate from the meeting server 110 and may be in communication with the meeting server 110 via a network. The producer device 160 may be a computing device that is configured to perform the various reaction message processing and reaction audio generating that is ultimately sent to the user devices 120-1 to **120-*n* via the meeting server 110. The involvement of the producer device 160** is described in more detail below.

Figure 2:
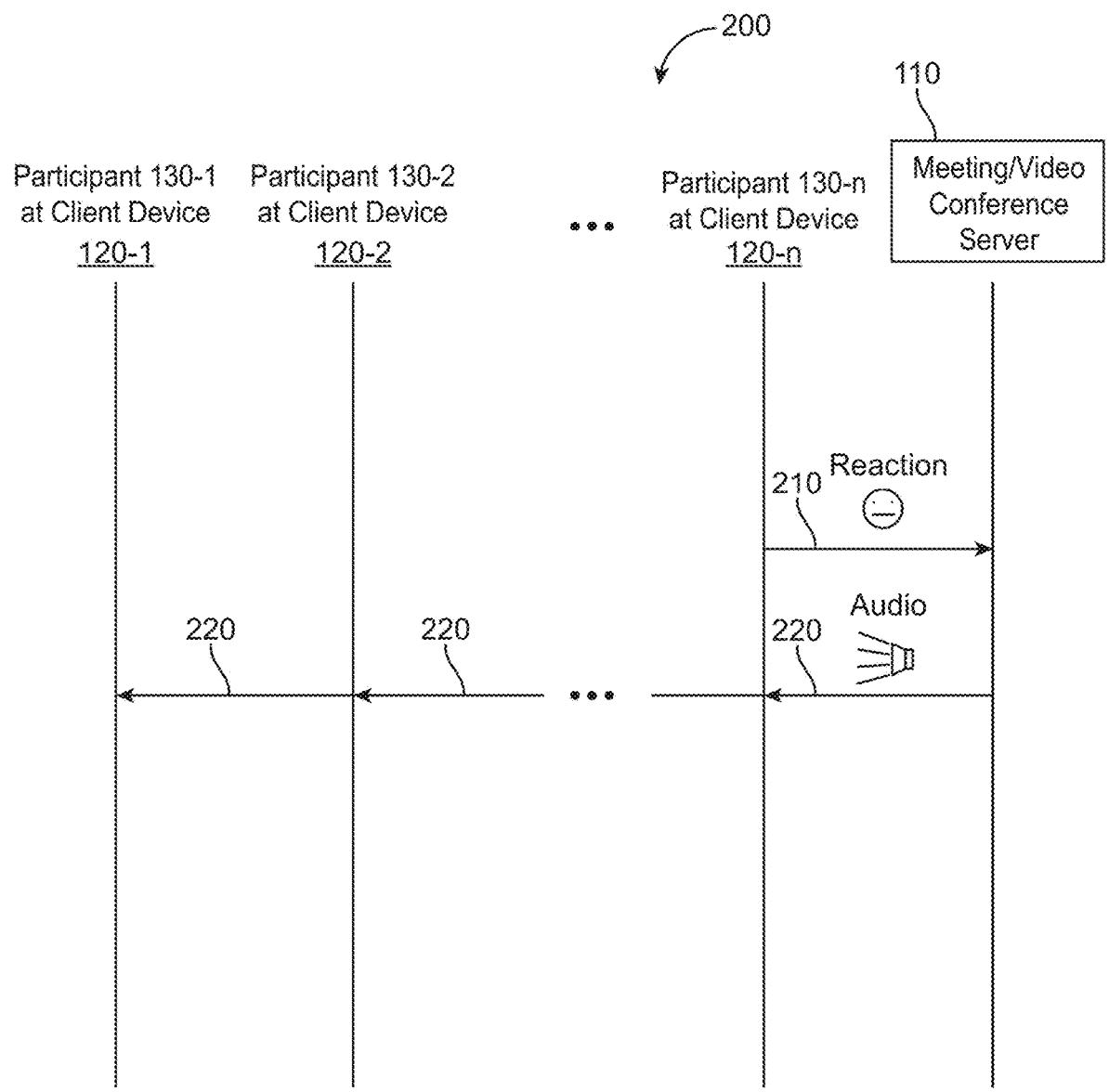
FIG. 2 is a sequence diagram showing how reaction audio is distributed to user devices during a communication session, according to an example embodiment.

FIG. 2 shows the mechanism described above in connection with FIG. 1, in the context of a sequence diagram 200. FIG. 2 shows exchanges between server 110 and client devices **120-1-120-*n*. The participant 130-*n* at client device 120-*n* initiates a reaction 210 to server 110. The server 110 interprets the reaction and sends reaction audio 220**.

Sending the Reaction

Figure 3:
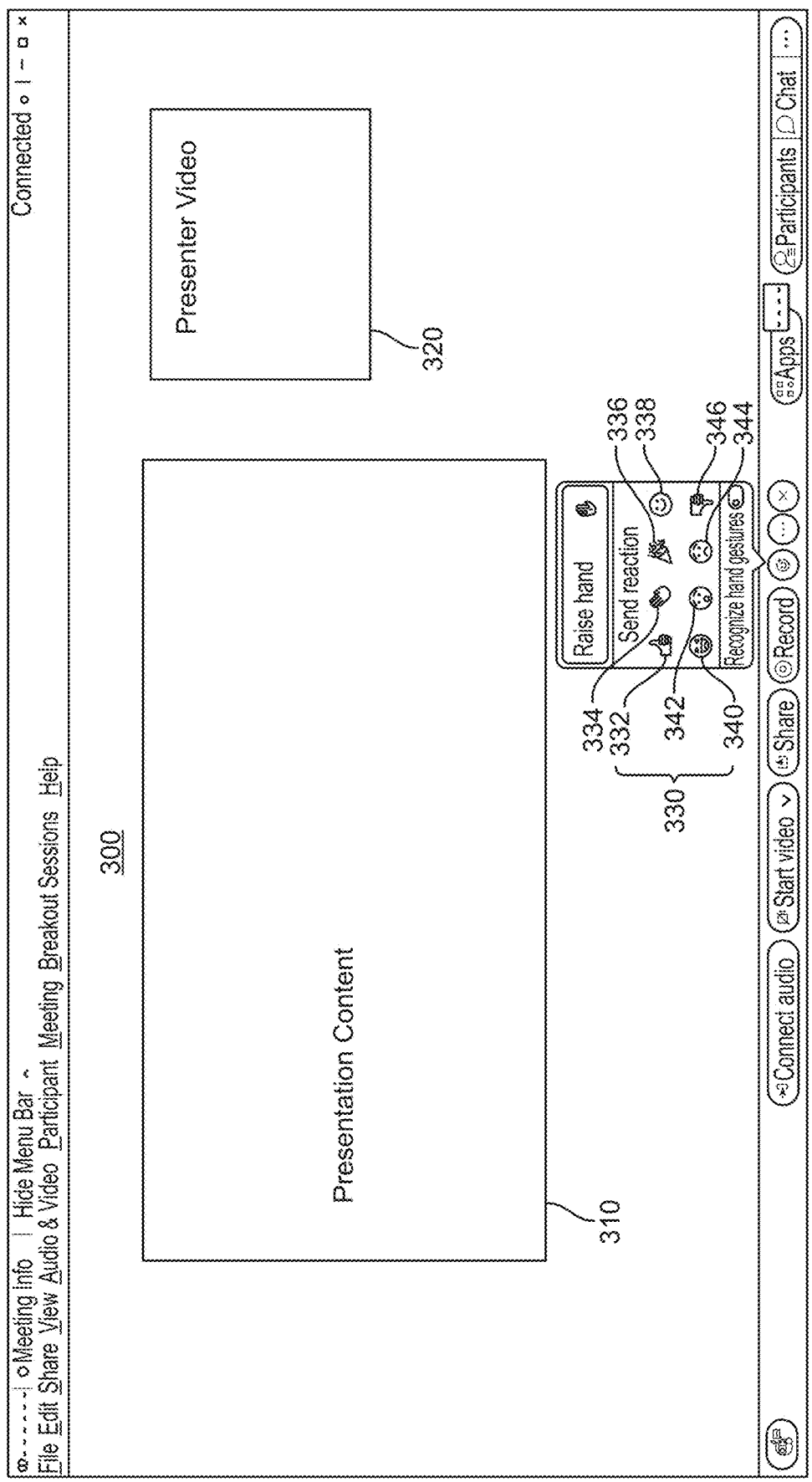
FIG. 3 is a diagram showing an example of a user interface screen from which a user may trigger a reaction to be sent, according to an example embodiment.

Reference is now made to FIG. 3, which illustrates an example user interface screen 300 that is presented to a participant at a client device during a communication session. The user interface screen 300 includes a content window 310 in which session content is shared and a video window 320 in which video of a presenter (and other meeting participants) may be displayed. The user interface screen 300 also includes a set of reaction icons (emoticons) 330 that may be selected by a participant during a communication session to send a reaction during the communication session, which reaction is interpreted by the meeting server to compose reaction audio that is sent to the client devices that are connected to the communication session. Such reaction icons 330 may include a "thumbs-up" icon 332, applause icon 334, celebration icon 336, smiley face icon 338, laughter icon 340, "wow" icon 342, sad face icon 344 and "thumbs-down" icon 346. When one of the reaction icons 330 is selected, an associated reaction message is sent from the client device to the server.

A participant that wants to send a reaction during a communication session may select one of the emoticons 330 that represents the reaction type the participant desires. A reaction message representing the selected reaction is sent to the meeting server. It is helpful if the user interface is easily available to the participant during a communication session, so that the reaction is sent as closely to the moment the speaker presented something that triggered the reaction. If the reaction audio occurs more than a few seconds after the event, it could be confusing or awkward for the presenter, rather than useful. Thus, the reaction audio may be more effective if it is sent to participants (and the presenter) within a predetermined time of the server receiving the reaction message. As one example, the reaction user interface may be pinned to the user interface screen the first time it is used in the communication session to improve this reaction time and makes it easier and more tempting for the participant to contribute their reaction.

Thus, the reaction indicated by a participant in a reaction message sent to the server may be one of a plurality of reaction types, and the associated reaction audio may be one of a plurality of reaction audio types. For example, a first reaction type is an applause emoticon and an associated first reaction audio type is clapping, a second reaction type is a laughter emoticon and an associated second reaction audio type is group laughter, a third reaction type is a wow emoticon and an associated third reaction audio type is for a cheering crowd audio type, etc.

Another way to deliver a reaction is by a participant making a physical gesture that is recognizable from their video, to trigger delivery of a reaction type. For example, a participant may clap and this may recognized as a first reaction type, similar to selecting an applause emoticon, and sending of a reaction message a corresponding reaction type. Another example is a participant giving a thumbs-up gesture, and that is used to send a reaction message with a corresponding reaction type even if a participant's outgoing audio is muted.

Composing the Reaction Audio

Reaction audio may be composed from individual, single reaction sound clips/audio clips, and the sound clips may be varied with random pitch and volume. This means one reaction (type) has one associated reaction audio, and this may be useful compelling because the participant can hear his or her own individual reaction audio. This may work when there is a relatively large number of reactions, but may sound unnatural when there are stray reactions, typically because some people may be a bit slower to find the reaction button on the user interface.

Figure 4:
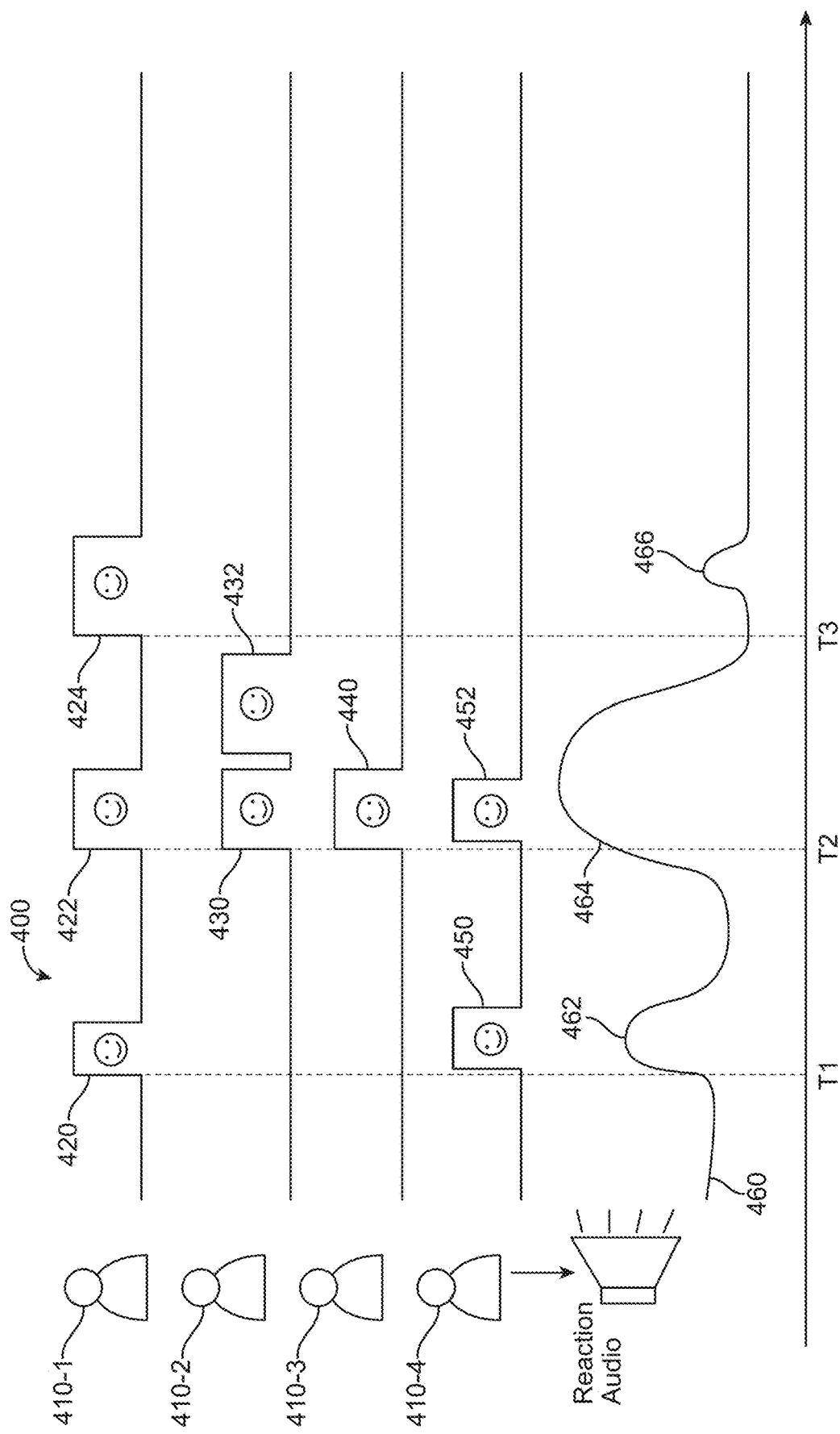
FIG. 4 is a timing diagram illustrating how different reactions may be sent from participants during a communication session and how reaction audio may be generated based on the participant reactions, according to an example embodiment.

Another approach is to play prerecorded sound of applause from a large group and dynamically adjust the volume based on the number of reactions at any point in time. This creates an atmosphere where each user reaction still contributes to the total effect, but where the single stray reactions are effectively not heard. This is shown in FIG. 4. FIG. 4 shows a sequence 400 in which multiple participants 410-1-410-4 are participant in a communication session. Participant 410-1 sends reactions 420, 422 and 424 at different times; participant 410-2 sends reactions 430 and 432 somewhat close in time with each other; participant 410-3 sends one reaction 440 and participant 410-4 sends two reactions 450 and 452. A waveform 460 represents an intensity of a reaction audio that the meeting server generates from the reactions from participants 410-1-410-4. The reaction audio type may be laughter, but it may vary and the particular audio type is not particularly relevant for purposes of the concepts presented in FIG. 4. The waveform 460 has pulses 462, 464 and 466 and are described below.

The server may adjust the intensity (e.g., volume, pitch, etc.) based on the number of participants (user devices) that sent reaction messages within a predetermined time interval of each other. For example, reaction 420 from participant 410-1 and reaction 450 from participant 410-4 are received relatively close to in time to each other around time T1 so there is an additive effect from the reactions 420 and 450 that results in an intensity shown by the pulse 462. Reactions 422, 430, 440 and 452 from participants 410-1-410-4, respectively, are received relatively close in time to each other around time T2. The intensity of the reaction audio from reactions 422, 430, 440 and 452 is quite large as shown by the pulse 464. Moreover, the pulse 464 extends for a longer period of time than pulse 462 because a further reaction 432 is received from participant 410-2 shortly after reaction 430 and the meeting server translates this is an extension to the duration of the pulse 462. The reaction 424 from participant 410-1 is received around time T3 at it is the sole reaction at that time. As a result, the pulse 466 is relatively small and short-lived.

The reaction audio itself may be generated by various means. In one example, each reaction type is based on a different recording or recordings of real audio of that type, such as: clapping for the applause reaction type, group laughter for the smiley reaction type, cheering crowd for the wow reaction type, etc. These audio clips may be mixed together depending on the number and types of reactions. In another example, the reaction audio may be computer-synthesized.

The duration of reaction audio may be set for a predetermined period of time (e.g., 3 seconds), absent some extended duration that may be desired, as depicted in FIG. 4. The reaction audio may be adjusted to create an atmosphere representative of the amount of participants providing reactions.

As shown in FIGS. 1 and 2, the reaction audio may be sent to the host and other participants by the meeting server 110. As an alternative, there may be implementations where it is desirable that reaction audio is supplied by a separate device, e.g., the producer device 160 shown in FIG. 1. The producer device 160 is connected to the communication session or in communication with the meeting server 110 so as to be under control of the meeting server 110. A video device Application Programming Interface (API) may be used by which the producer device 160 is notified when reactions occur, and an audio player composes the reaction sounds and plays them into the communication session, via the meeting server 110. In any implementation, the reaction audio may be injected without the presenter/host having to do anything different from normal, and without stealing the presentation share from the presenter. All participants in the communication session, whether on mobile devices, laptops or video conference endpoint devices, smartphones, etc., will hear the reaction sounds, since it is just injected into the audio stream for the communication session.

In some implementations, it may be desirable to have a human involved in the reaction audio playback control. For example, to address a potential problem of delayed reactions, in certain very large conferences, a moderator/producer may be designated who controls the addition of reaction audio to assure accurate timing and reactions throughout the conference. In this scenario, the reaction messages are received from the participants, and without automatically playing out reaction audio, the reaction messages are displayed in a user interface to a producer. The producer may then take the engagement from the participants as input as to when, how often, and how loud any reaction should be played, but it is still the producer who can actually play reaction audio into the conference.

Figure 5:
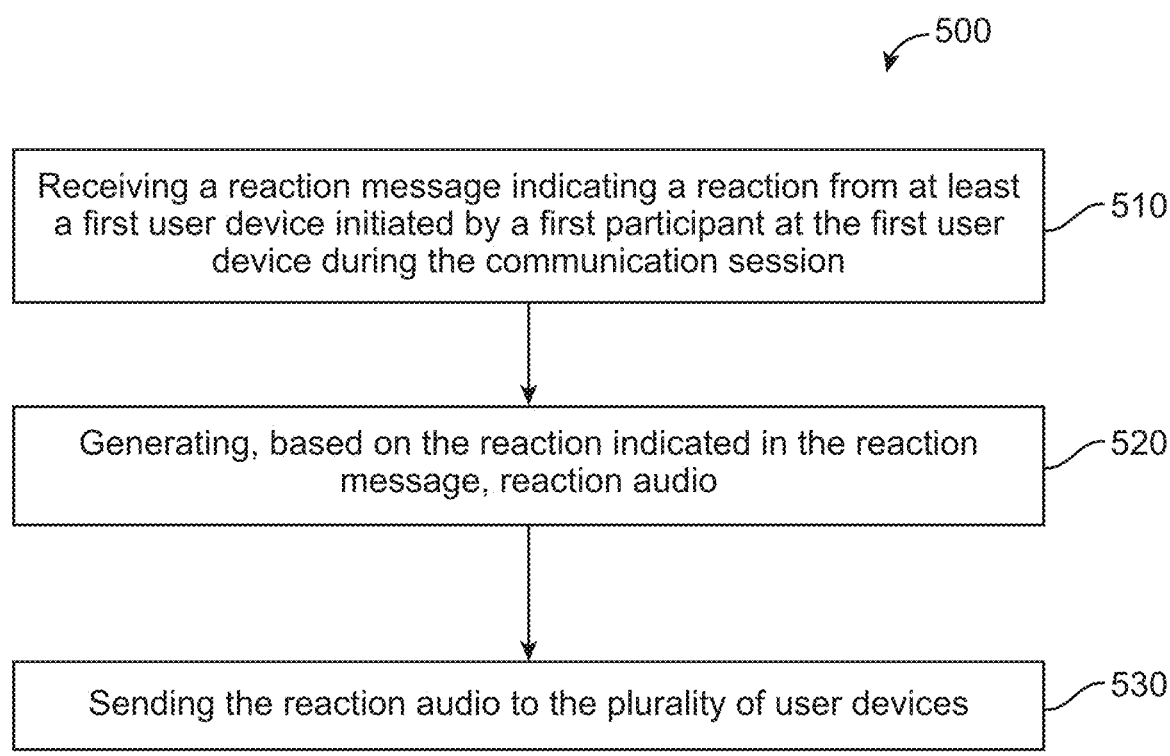
FIG. 5 is a high-level flow chart depicting operations performed by a meeting server to coordinate the generation and distribution of reaction audio during a communication session, according to an example embodiment.

Reference is now made to FIG. 5. FIG. 5 illustrates a flow chart of a method 500 according to an example embodiment. The method 500 is performed in connection with a communication session among a plurality of participants at respective ones of a plurality of user devices. At step 510, the method 500 includes receiving a reaction message indicating a reaction from at least a first user device initiated by a first participant at the first user device during the communication session. At step 520, the method 500 includes generating, based on the reaction indicated in the reaction message, reaction audio. Step 530 involves sending the reaction audio to the plurality of user devices.

In one form, steps 510-530 of method 500 are performed by a meeting server that is in communication with the plurality of user devices. In another form, one or more of steps 510-530 are performed by a device separate from a meeting server.

The step 530 of sending the reaction audio may include sending the reaction audio within a predetermined time of receiving the reaction message.

In one example, step 510 of receiving may include receiving a reaction message from each of multiple user devices of the plurality of user devices, step 520 of generating may include generating unique reaction audio based on the reaction message from each of the multiple user devices, and step 530 of sending may include sending the unique reaction audio associated with the reaction message from each the multiple user devices. Further, step 520 of generating the reaction audio may include generating the unique reaction audio by randomly modifying in pitch and/or volume a single audio segment. That is, the reaction audio (an audio clip) for different reactions from different participants may be derived by adjusting an audio clip, in pitch and/or volume, in a random or other (e.g., predetermined) manner.

In another example, step 510 of receiving may include receiving a reaction message from each of multiple user devices of the plurality of user devices. Step 520 of generating may include adjusting a volume of the reaction audio based on the number of user devices that sent reaction messages within a predetermined time interval.

As explained above, the reaction indicated in the reaction message may be one of a plurality of reaction types, and the reaction audio may be a corresponding one of a plurality of reaction audio types. Furthermore, step 520 of generating may include generating a particular reaction audio type based on a reaction type of the reaction indicated in the reaction message. In one form, step 510 of receiving may include receiving a reaction message from each of multiple user devices, each reaction message indicating an associated reaction type, and step 520 of generating includes mixing a plurality of reaction audio types based on the associated reaction type indicated in the reaction message from each of the multiple user devices.

In one example, a first reaction type is an applause emoticon and an associated first reaction audio type is clapping, a second reaction type is a laughter emoticon and an associated second reaction audio type is group laughter, a third reaction type is a wow emoticon and an associated third reaction audio type is for a cheering crowd audio type.

As described above, the reaction message may be derived from one or more physical gestures of a participant.

Figure 6:
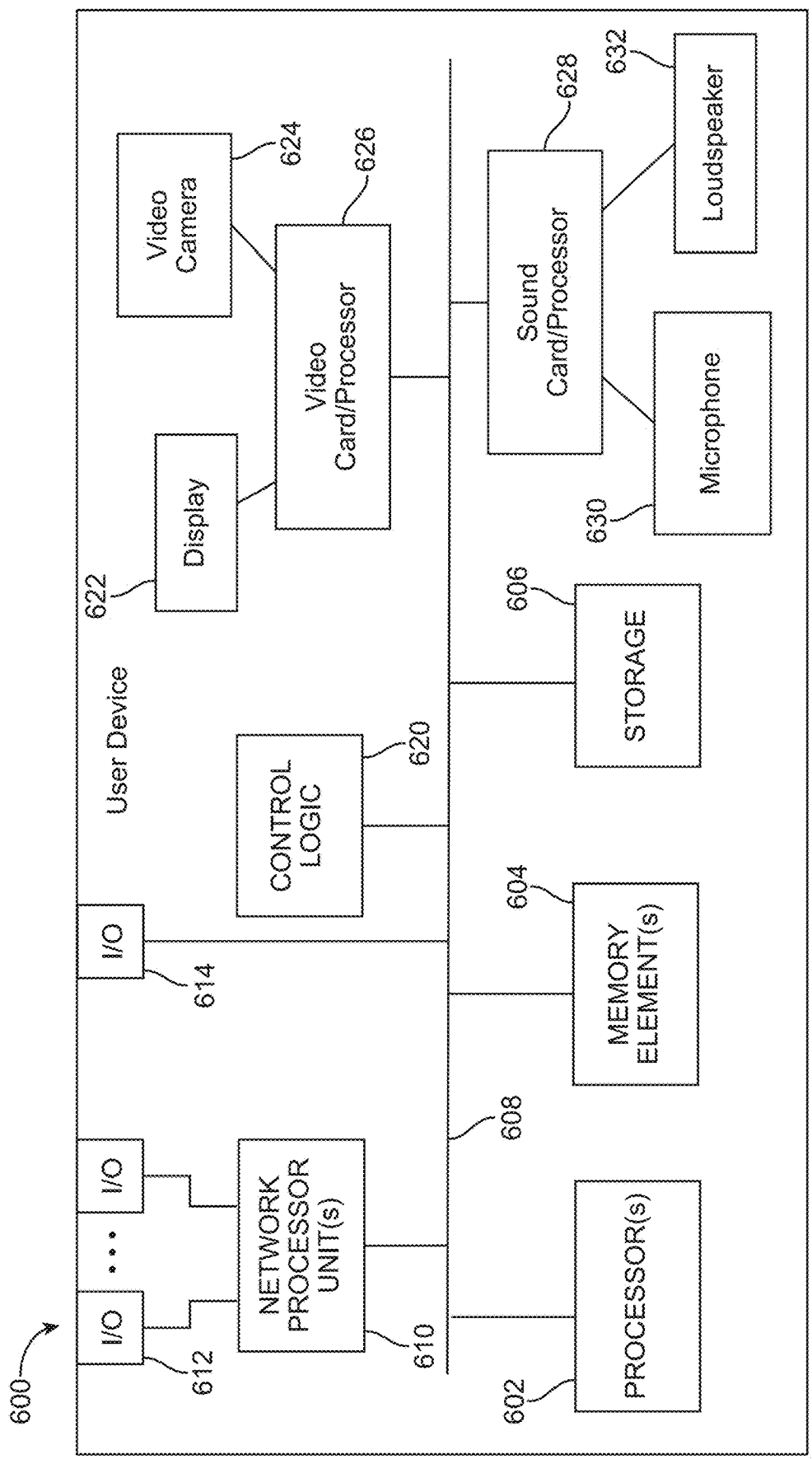
FIG. 6 is a hardware block diagram of a user device that may be configured to participate in the techniques presented herein, according to an example embodiment.

Reference is now made to FIG. 6. FIG. 6 shows a block diagram of a device 600 that is representative of a user device, e.g., any of the user devices 120-1 to 120-n shown in FIGS. 1 and 2, that may participate in the various embodiments presented herein. The user device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for user device 600 can overlap in any manner and are not limited to the specific allocation of instructions and/or operations described herein.

In at least one embodiment, processor(s) 602 is/are at least one hardware processor configured to execute various tasks, operations and/or functions for user device 600 as described herein according to software and/or instructions configured for user device 600. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with user device 600, and/or logic configured for memory element(s) 604 and/or storage 606. For example, any logic described herein (e.g., control logic 620) can, in various embodiments, be stored for user device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of user device 600 to communicate in order to exchange information and/or data. Bus 608 can be implemented with any architecture designed for passing control, data and/or information between processors, memory elements/storage, peripheral devices, and/or any other hardware and/or software components that may be configured for user device 600. In at least one embodiment, bus 708 may be implemented as a fast kernel-hosted interconnect, potentially using shared memory between processes (e.g., logic), which can enable efficient communication paths between the processes.

In various embodiments, network processor unit(s) 610 may enable communication between user device 600 and other systems, entities, e.g., meeting server 110, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to user device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For the sake of completeness, FIG. 6 shows that the user device 600 further includes a display 622, video camera 624, video card/processor 626, sound card/processor 628, microphone 630 and loudspeaker 632. The video card/processor 626 may be coupled to the bus 608. The display 622 and video camera may be coupled to the video card/processor 626. Similarly, the sound card/processor 628 may be coupled to the bus 608, and the microphone 630 and loudspeaker 632 are connected to the sound card/processor 628.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Figure 7:
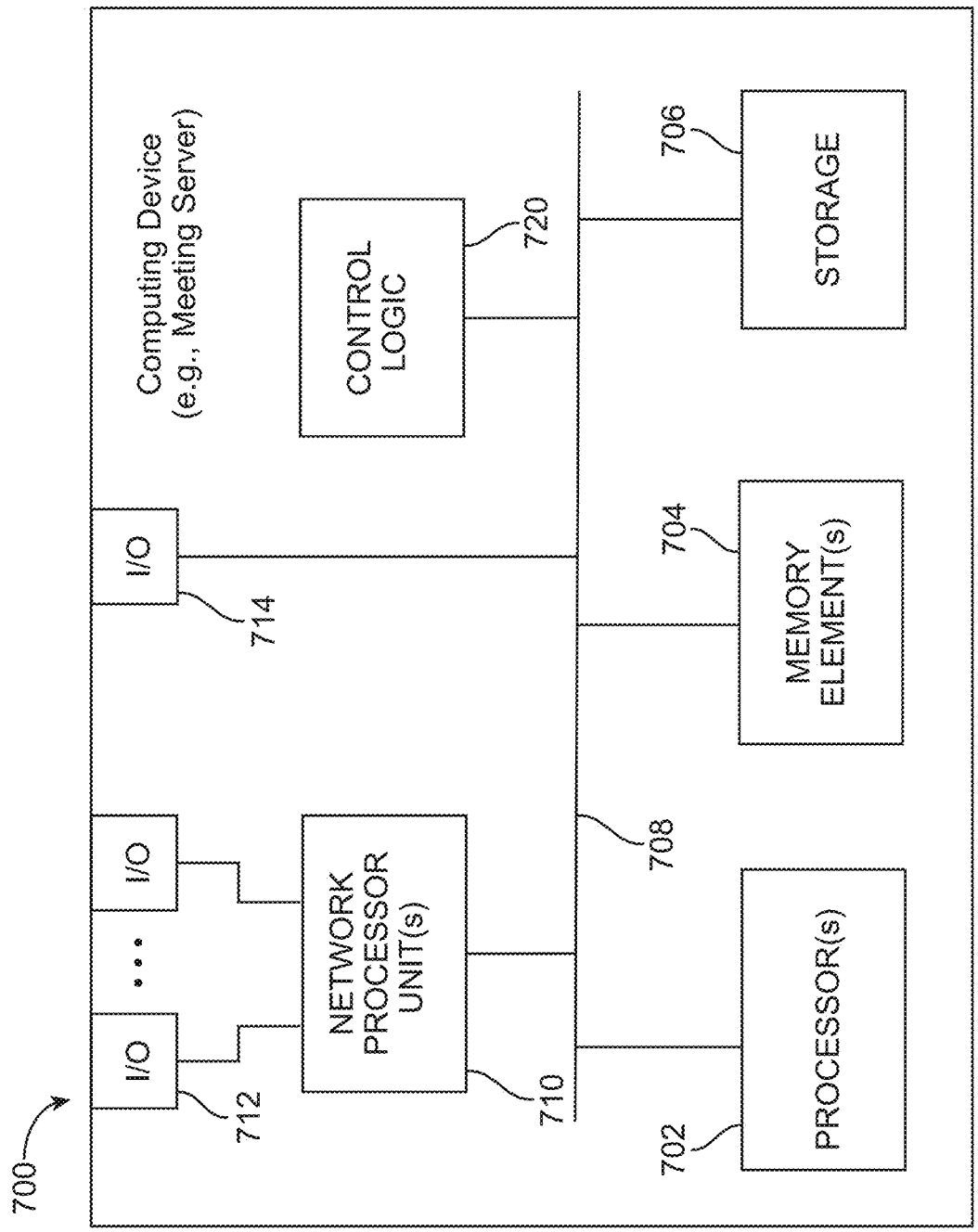
FIG. 7 is a hardware block diagram of computing device that may be configured to perform operations of a meeting server as part of the techniques presented herein, according to an example embodiment.

Referring to FIG. 7, FIG. 7 illustrates a hardware block diagram of a computing device 700 that may be representative of the meeting server 110 configured to perform the techniques depicted in FIGS. 1-5.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, in one form, a method is provided comprising: in a communication session among a plurality of participants at respective ones of a plurality of user devices, receiving a reaction message indicating a reaction from at least a first user device initiated by a first participant at the first user device during the communication session; generating, based on the reaction indicated in the reaction message, reaction audio; and sending the reaction audio to the plurality of user devices.

In one form, the reaction audio may be sent within a predetermined time of receiving the reaction message.

In one form, receiving comprises receiving a reaction message from each of multiple user devices of the plurality of user devices; generating comprises generating unique reaction audio based on the reaction message from each of the multiple user devices; and sending comprises sending the unique reaction audio associated with the reaction message from each the multiple user devices. Moreover, generating the unique reaction audio may include randomly modifying in pitch and/or volume a single audio segment.

In one form, the receiving, generating and sending are performed at a meeting server that is in communication with the plurality of user devices. In another form, one or more of the receiving, generating and sending are performed by a device separate from a meeting server that is in communication with the plurality of user devices.

Furthermore, in one form, receiving comprises receiving a reaction message from each of multiple user devices of the plurality of user devices; and generating comprises adjusting a volume of the reaction audio based on a number of user devices that sent reaction messages within a predetermined time interval.

In one form, the reaction indicated in the reaction message is one of a plurality of reaction types, and the reaction audio is a corresponding one of a plurality of reaction audio types. Thus, the step of generating the reaction audio may comprise generating a particular reaction audio type based on a reaction type of the reaction indicated in the reaction message. Moreover, the step of receiving may comprise receiving a reaction message from each of multiple user devices, each reaction message indicating an associated reaction type, and the step of generating may involve mixing a plurality of reaction audio types based on the reaction type indicated in the reaction message from each of the multiple user devices. As described above, a first reaction type may be an applause emoticon and an associated first reaction audio type is clapping, a second reaction type may be a laughter emoticon and an associated second reaction audio type is group laughter, a third reaction type may be a wow emoticon and an associated third reaction audio type is for a cheering crowd audio type.

The embodiments presented herein also involve deriving the reaction message from one or more physical gestures of a participant.

In one form, an apparatus is provided that comprises: a network interface that enables network communications with a plurality of user devices connected to a communication session among a plurality of participants at respective ones of the plurality of user devices; and at least one processor coupled to the network interface, wherein the at least one processor is configured perform operations including: receiving a reaction message indicating a reaction from at least a first user device initiated by a first participant at the first user device during the communication session; generating, based on the reaction indicated in the reaction message, reaction audio; and sending the reaction audio to the plurality of user devices.

In still another form, one or more non-transitory computer readable storage media are provided encoded with software instructions that, when executed by a processor, cause the processor to perform operations associated with supporting communications with a plurality of user devices connected to a communication session among a plurality of participants at respective ones of the plurality of user devices, the operations including: receiving a reaction message indicating a reaction from at least a first user device initiated by a first participant at the first user device during the communication session; generating, based on the reaction indicated in the reaction message, reaction audio; and sending the reaction audio to the plurality of user devices.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
in a communication session among a plurality of participants at respective ones of a plurality of user devices, receiving a reaction message indicating a reaction from at least a first user device initiated by a first participant at the first user device during the communication session;
generating a reaction audio by determining a reaction type for the reaction audio based on the reaction indicated in the reaction message and generating a waveform for the reaction audio, the waveform having an intensity that is based on a number of user devices of the plurality of user devices that sent reaction messages including a respective reaction of the same reaction type within a predetermined time interval of receiving the reaction message; and
sending the reaction audio to the plurality of user devices.

2. The method of claim 1, wherein sending comprises propagating the reaction audio to the plurality of user devices during the communication session and within a predetermined time of receiving the reaction message.

3. The method of claim 1, wherein:
receiving comprises receiving a respective reaction message from each of multiple user devices of the plurality of user devices;
generating comprises generating a unique reaction audio based on the respective reaction message from each of the multiple user devices; and
sending comprises sending the unique reaction audio associated with the reaction message from each of the multiple user devices.

4. The method of claim 3, wherein generating comprises generating the unique reaction audio by randomly modifying in pitch and/or volume a single audio segment.

5. The method of claim 1, wherein:
receiving comprises receiving a respective reaction message from each of multiple user devices of the plurality of user devices; and
generating the waveform includes adjusting a volume and a pitch of the reaction audio based on the number of user devices that sent the reaction messages within the predetermined time interval.

6. The method of claim 1, wherein the reaction indicated in the reaction message is one of a plurality of reaction types, and wherein the reaction audio is a corresponding one of a plurality of reaction audio types.

7. The method of claim 6, wherein:
receiving comprises receiving a respective reaction message from each of multiple user devices of the plurality of user devices,
each respective reaction message indicates an associated reaction type, and
generating comprises injecting into an audio stream of the communication session, the plurality of reaction audio types based on the associated reaction type indicated in the reaction message from each of the multiple user devices.

8. The method of claim 6, wherein a first reaction type is an applause emoticon and an associated first reaction audio type is clapping, a second reaction type is a laughter emoticon and an associated second reaction audio type is group laughter, a third reaction type is a wow emoticon and an associated third reaction audio type is for a cheering crowd audio type.

9. The method of claim 1, wherein the reaction message is derived from one or more physical gestures of the first participant.

10. The method of claim 1, wherein the receiving, generating and sending are performed at a meeting server that is in communication with the plurality of user devices.

11. The method of claim 1, wherein one or more of receiving, generating and sending are performed by a device separate from a meeting server that is in communication with the plurality of user devices.

12. The method of claim 1, wherein sending the reaction audio includes:
injecting the reaction audio into an audio stream of the communication session, the reaction audio being a pre-defined audio clip of a predetermined duration; and
providing the audio stream to the plurality of user devices.

13. The method of claim 1, wherein the reaction message is generated when an audio of the first user device is muted and in response to an input selection of one of a plurality of emoticons displayed on a user interface screen of the first user device.

14. An apparatus comprising:
a network interface that enables network communications with a plurality of user devices connected to a communication session among a plurality of participants at respective ones of the plurality of user devices; and
at least one processor coupled to the network interface, wherein the at least one processor is configured perform operations including:
receiving a reaction message indicating a reaction from at least a first user device initiated by a first participant at the first user device during the communication session;
generating a reaction audio by determining a reaction type for the reaction audio based on the reaction indicated in the reaction message and generating a waveform for the reaction audio, the waveform having an intensity that is based on a number of user devices of the plurality of user devices that sent reaction messages including a respective reaction of the same reaction type within a predetermined time interval of receiving the reaction message; and
sending the reaction audio to the plurality of user devices.

15. The apparatus of claim 14, wherein the reaction indicated in the reaction message is one of a plurality of reaction types, and wherein the reaction audio is a corresponding one of a plurality of reaction audio types.

16. The apparatus of claim 14, wherein the at least one processor is configured to perform sending of the reaction audio by propagating the reaction audio to the plurality of user devices during the communication session and within a predetermined time of receiving the reaction message.

17. The apparatus of claim 14, wherein the reaction message is generated, by the at least one processor, when an audio of the first user device is muted and in response to obtaining an input selection of one of a plurality of emoticons displayed on a user interface screen of the first user device.

18. One or more non-transitory computer readable storage media encoded with software instructions that, when executed by a processor, cause the processor to perform operations associated with supporting communications with a plurality of user devices connected to a communication session among a plurality of participants at respective ones of the plurality of user devices, the operations including:
receiving a reaction message indicating a reaction from at least a first user device initiated by a first participant at the first user device during the communication session;
generating a reaction audio by determining a reaction type for the reaction audio based on the reaction indicated in the reaction message and generating a waveform for the reaction audio, the waveform having an intensity that is based on a number of user devices of the plurality of user devices that sent reaction messages including a respective reaction of the same reaction type within a predetermined time interval of receiving the reaction message; and
sending the reaction audio to the plurality of user devices.

19. The non-transitory computer readable storage media of claim 18, wherein the reaction indicated in the reaction message is one of a plurality of reaction types, and wherein the reaction audio is a corresponding one of a plurality of reaction audio types.

20. The non-transitory computer readable storage media of claim 18, wherein the software instructions that cause the processor to perform sending the reaction audio include instructions for propagating the reaction audio to the plurality of user devices during the communication session and within a predetermined time of receiving the reaction message.

\* \* \* \* \*